GLENN H. BULLOCK
JOHN R. TURNER
JOHN H. McLEOD
INVENTORS

BY
ATTORNEYS

Patented July 10, 1945

2,380,275

UNITED STATES PATENT OFFICE 2,380,275

METHOD AND APPARATUS FOR POLISHING GLASS AND LIKE SUBSTANCES

John R. Turner, John H. McLeod, and Glenn H. Bullock, Rochester, N. Y., assignors to Eastman Kodak Company, Rochester, N. Y., a corporation of New Jersey Application April 14, 1943, Serial No. 482,992

19 Claims. (Cl. 51—263)

The present invention relates to a method and apparatus for mechanically polishing glass and other substances, especially in the form of optical elements; and particularly to a method and apparatus for automatically controlling the supply of lubricant, or lubricant and abrasive, to the work during the polishing operation as required.

It is rather well-known that the fastest polishing of glass is obtained when the polisher is neither too wet nor too dry. If it is too wet the polisher is undoubtedly prevented from contacting the glass by the lubricating action of the lubricant. If the polisher gets too dry the force required becomes so great that damage is done to the polisher, the glass, the machine, or to more than one of these parts. The rise in temperature is another factor dependent upon the force of friction which is controlled by the amount of lubricant applied. While a variety of different abrasives and different lubricants may be used in polishing, rouge is one of the most common abrasives used and water is the most common lubricant used with this particular abrasive; and, therefore, these two will be referred to throughout this specification when a particular abrasive and lubricant is mentioned.

We have carried out experiments that have showed that glass can be polished in considerably less time if small amounts of water are applied just as required instead of in large amounts once in a while, as is common practice now. Furthermore, the addition of small amounts of water at the proper time rather than large amounts once in a while results in a substantial saving in abrasive, because the unused abrasive is not washed away by the application of an excess of lubricant before doing its maximum amount of polishing.

It has been proposed to automatically apply a mixture of rouge and water to the work whenever the force of friction between the polisher and glass exceeds a predetermined value (British Patent 126,489, Taylor, May 15, 1919). The known arrangements for accomplishing this have, however, possessed certain disadvantages which have limited their usefulness so far as practical applications are concerned. In the first place, the known arrangements for carrying out this idea have been rather complicated due partly to the necessity of rapidly circulating the supply of rouge and water to prevent the rouge from settling out, it having been considered essential to apply abrasive and lubricant as a mixture. Secondly, the known arrangements have depended directly on the force of friction for their operation.

We have found that, if a quantity of rouge is applied to the work before the polishing operation is started, it is not necessary to apply more rouge very often during the polishing operation. Accordingly, our novel method requires only the addition of water most of the time, the rouge being applied manually as needed, and the apparatus for carrying out the method is greatly simplified by applying only water. We have further found that the coefficient of friction between the tool and work is a more fundamental factor in the control of the application of water to the work than the force of friction, because it depends largely, if not entirely, upon the degree of dryness of the work, whereas the force of friction depends also upon the force holding the polisher against the work, i. e., the normal force. It is often advantageous to change the normal force during the polishing operation or when changing to another piece of work. This has little or no effect upon the degree of dryness when the coefficient of friction is the basis of control, but if the force of friction is the controlling factor the degree of dryness is so changed as to necessitate the inconvenience of readjusting the apparatus.

One object of the present invention is to provide a method of polishing wherein a lubricant is automatically added to the work when the same becomes too dry.

Another object is to provide a method of polishing wherein the coefficient of friction alone or in combination with the force of kinetic friction between the tool and work is utilized to indicate the need for lubricant, and is utilized to supply lubricant in the most efficient manner in accordance with such needs.

A further object is to use the coefficient of kinetic friction as a control factor by applying the working or normal force to the polishing tool through an angle of friction which may, or may not, be variable.

And another object is to combine the force of kinetic friction with the coefficient of kinetic friction as a control factor by purposely introducing moments of force which combine with or counteract those derived by applying the working force to the tool through an angle of friction.

And another object is to provide an apparatus for carrying out the above-mentioned method, and which apparatus is simple, efficient, rugged, and is applicable to most existing polishing machines without inconvenience.

And yet another object is the provision of an apparatus of the type set forth which includes parts which are readily adjustable to permit the utilization of any value of coefficient of kinetic friction as a control factor, and parts which are movable in response to a predetermined value of coefficient of kinetic friction to indicate the need for additional lubricant on the work.

And still another object is the provision of an apparatus of the type set forth which includes a means for applying lubricant to the work, and which means is operated at the proper time by the parts of the apparatus movable in response to the coefficient of friction being exceeded, and until the coefficient of friction returns to a value equal to, or below, a predetermined value.

And another object is to provide an apparatus of the type set forth in which the lubricant is supplied intermittently to the work by a pumping mechanism, one of the parts of the apparatus being movable in response to changes in the coefficient of kinetic friction and constituting a part of, or a control member for, said pumping mechanism.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which.

Fig. 4 is a sectional view taken substantially on line 4—4 of Fig. 3, Figs. 5 and 6 are force diagrams of the mechanism to clearly point out how the normal working force is applied to the polishing tool so that the coefficient of kinetic friction is used through the angle of friction to indicate the need of lubricant and to cause the application of lubricant to the work.

Like reference characters refer to corresponding parts throughout the drawings.

Briefly, in accordance with the present invention the normal polishing force is applied to the polishing tool through an articulated member which is pivoted to a reciprocating spindle at a point spaced laterally relative to a point of pivotal connection between the articulated member and the tool. As a result of the connection between the spindle and the polishing tool, the normal force is applied to the tool through an angle of friction so that when the coefficient of friction between the work and the tool alone or in combination the kinetic friction between these parts exceeds a predetermined value it will cause a relative pivotal movement between the articulated member and the spindle which will indicate that the work is too dry. In addition, the parts are so arranged that this relative movement between the articulated member and the spindle will be reciprocal depending upon the direction of movement of the tool over the work, and this reciprocal movement is used to automatically apply lubricant to the work in a most efficient manner.

Referring now to the drawings, 10 is a spindle which is adapted to be continually reciprocated from right to left and left to right (looking at Figs. 1, 3, 5 and 6) by a suitable mechanism as is well-known, but which we have chosen to illustrate as including the crank 11 adapted to be oscillated by any mechanism, not shown, and terminating in a collar 14 surrounding the spindle 10. The work to be polished is secured in a blocking body 15 in any known manner, and this blocking body is adapted to be detachably connected to a support 16 which is rotated during the polishing operation. In the present instance, we have chosen to show the work to be polished as a plurality of prisms, and we have indicated the table as being rotated in a counter-clockwise direction. The work is polished by a polishing tool 17 which is adapted to rest on the work and be reciprocated thereacross by the motion of the spindle 10. The polishing tool conforms to the shape of the work being polished (in this case a flat) and the polishing action is accomplished by the combination of an abrasive and a lubricant, rouge and water being commonly used in the polishing of glass. Although for purposes of illustrating the present invention we have shown the polishing tool above and moved over the work to be polished, it is pointed out that oftentimes it is desirable or necessary to reverse the relative position of these two parts, putting the work above the tool and applying the driving force thereto. The features of the invention will be obtained regardless of the relative position of these two parts. Therefore, in the claims when we refer to the oscillatable tool holder as the polishing tool we are referring to the holder broadly, and intend it to cover the driven tool whether it carries the polisher or glass to be polished.

In known polishing apparatus, the polishing tool is generally connected directly to the end of the spindle to be reciprocated thereby. In such an arrangement the working force is applied substantially at right angles to the polishing tool, and it is in this connection that the present invention differs from known arrangements.

Figures 1, 2:
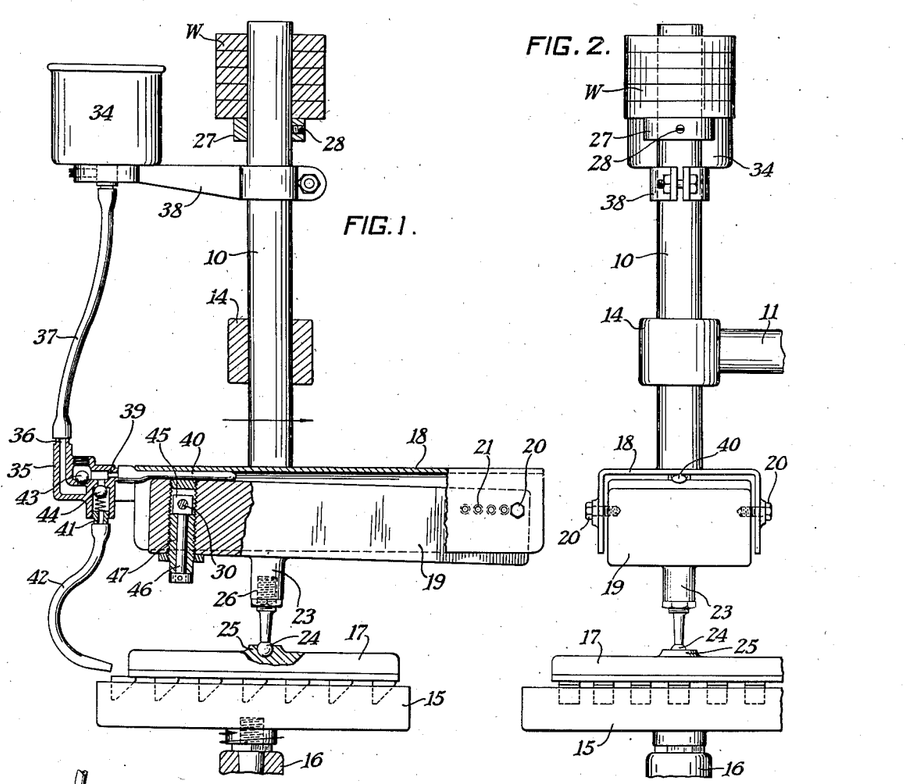
Fig. 1 is a front elevational view, partly in section, of a polishing machine incorporating an automatic lubricant applying device constructed in accordance with a preferred embodiment of the present invention; and showing the parts in their normal position which they assume when the work is sufficiently lubricated or when the tool is moving to the right (looking at the figure).
Fig. 2 is a side elevation of the mechanism shown in Fig. 1.
Figure 3:
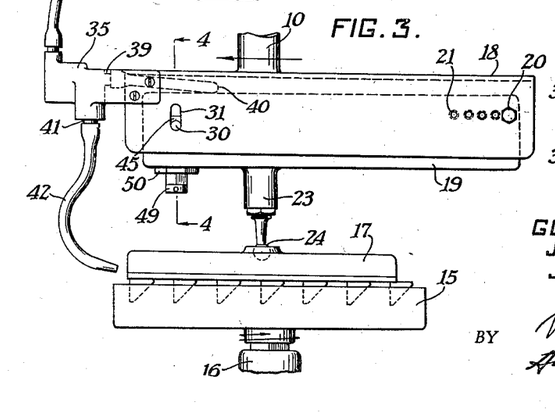
Fig. 3 is a view similar to Fig. 1, but showing the parts in the position they assume when the polishing tool is moving in the direction indicated by the arrow (to the left), and when the work is not sufficiently lubricated.
Figure 4:
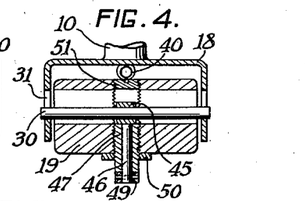

In accordance with the present invention, the spindle 10 terminates in a section which extends transversely of the spindle itself, and which we have chosen to show as a channel-shaped member 18 arranged so that its trough is directed downwardly. Located within the channel member 18 is a member, or block, 19 which is adapted to be articulated at one end to the side walls of the channel at a point spaced from the axis of the spindle so as to permit a relative pivotal movement between the block and channel in a vertical direction. The articulate, or pivotal, connection between the block and channel may constitute a pair of hinge pins 20 threaded into tapped openings 21 in the side walls of the channel and engaging holes in the block as shown in Fig. 2. The channel is preferably provided with a plurality of tapped openings spaced longitudinally of the channel so that the point of connection between the block and channel may be adjusted for the purpose hereinafter set forth. To limit the relative pivotal movement between the block 19 and the channel 18 there is provided a pin-and-slot connection between the two which may comprise a pin 30 extending through the block 19 adjacent to the end thereof and fixed thereto to move therewith, and engaging slots 31 in the walls of the channel, see Fig. 4.

Extending downwardly from the bottom of the block 19 is a post 23 terminating in a ball 24 which engages a socket 25 in the top of the polishing tool. It should be noted that the post 23 is spaced laterally of the pivotal connection between the block and the channel, for reasons hereinafter set forth, and although the ball 24 may be integral with the post 23, it is preferable to have a threaded connection 26 between the two, as shown, so that the vertical distance between the ball and socket connection and the block and channel connection may be varied for reasons which will be clearly set forth hereinafter.

As shown in Fig. 1, the spindle 10 may be slidably mounted in the collar 14 so that it is free to slide axially thereof while being reciprocated through its connection therewith. Or, the spindle 10 could be fixed to the collar 14 and the crank 11 could be pivoted to the reciprocating mechanism, not shown, so that the crank and spindle are free to move vertically relative to the work. The normal working force is applied downwardly of the spindle 10 in any suitable way, and for purposes of illustration, we have shown a plurality of annular weights W slipped over the top of the spindle and supported by a collar 27 fixed to the spindle by a set-screw 28. It will thus be obvious that the normal force is applied to the block 19 through the pivotal connection between the same and the channel 18 and at the critical stage is finally applied to the polishing tool through a line joining this pivotal connection and the ball-and-socket joint between the block and polishing tool. By this arrangement, the working force is applied to the tool through an angle of friction so that the coefficient of kinetic friction between the tool and surface to be polished is made use of to indicate when the work is too dry and to control the addition of lubricant to the work.

Figure 5:
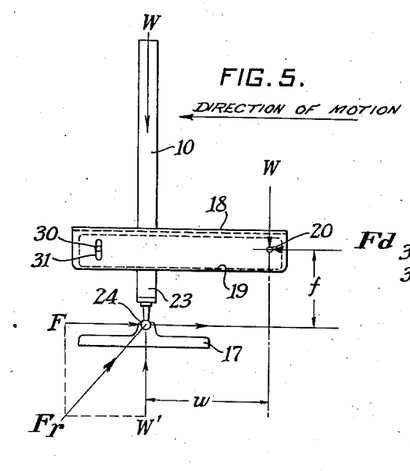
Figure 6:
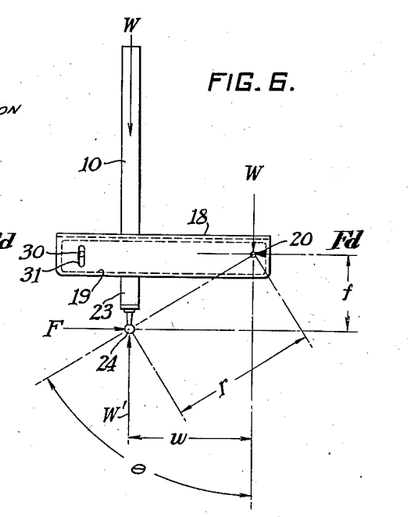

The actual operation of this invention and the theory behind it will probably be more clearly understood by reference to the force diagrams shown in Figs. 5 and 6. When the spindle 10 is being moved to the left, looking at Figs. 1, 3, 5 and 6 and indicated by a directional arrow in Fig. 5, by a driving force $F_d$, the movement of the polishing tool 17 will be opposed by a force of kinetic friction F which will vary with the value of the normal force W and the amount of lubricant on the work. A force W' equal and opposite to the normal force W will act upwardly on the ball 24 through a moment arm $w$ to tend to swing the block 19 clockwise of the pivot point 20 and toward the channel. At the same time, the frictional force F will act through a moment arm $f$ and tend to swing the free end of the block 19 counter clockwise of the pivot point 20 and away from the channel. Therefore, if W'=force equal and opposite to normal force W
F =frictional force
$w$ =moment arm of normal force
$f$ =moment arm of frictional force then when $W' \cdot w < F \cdot f$ then the lower assembly (meaning the block 19, the post 23 and the ball 24 thereon) will overturn within the mechanical limits allowed by the pin-and-slot connection 30 and 31 between the block and channel. Any rotation of the lower assembly about the hinge pins 20 will raise the weighted spindle 10, because the polishing tool resting on the work cannot be lowered, to allow the pin 30 to assume a new $r \cos \theta$ height above the work. Obviously, $f = r \cos \theta$ will increase as $\theta$ (the angle of kinetic friction) decreases so that the pin-and-slot connection between the block 19 and the channel 18 is necessary to limit this overturning action, otherwise the ball 24 would tend to jump out of the socket 25 when the frictional force F exceeds a certain value. This has been known to happen in conventional polishing machines using a ball-and-socket connection directly between the spindle and the polishing tool when the work became too dry, and with the result that the machine not only has to be stopped for reconnection of the parts, but the ball often drops on the work and damages it.

The theory of operation of the device may be rendered clearer if considered in another way. Looking at Figs. 5 and 6, the forces F and W' acting on the ball 24 may be resolved into a resultant force $F_r$ will be equal and opposite to the downward force applied to the tool, and its direction will define the direction of application of the downwardly applied force. The direction of the force $F_r$ will vary with the ratio $$\frac{F}{W}$$

and will consequently vary between positions where it passes above the pivot point 20 and positions where it passes below pivot point 20. So long as the resultant force $F_r$, and consequently the downwardly applied force, passes above pivot point 20, a torque will be applied to block 19 tending to swing it clockwise about pivot point 20 and hold it against the channel 18, this being the normal position of the parts, or the position assumed when no lubricant is required. If, however, the work becomes too dry and the force F increases to a value inconsistent with the coefficient of kinetic friction selected by the chosen relationship of parts, the force $F_r$ will pass below the pivot point 20 and provide a torque which will swing the block 19 counter clockwise of pivot point 20 and trip the device.

When the relationship of forces F and W' are such that the resultant force $F_r$, or applied force, passes directly along the line of pivots 24 and 20, the critical point is reached, and a further increase in the force F will cause the device to trip. Consequently, the angle of this line of pivots is the critical angle of friction and its tangent is $$\frac{F}{W}$$

or the coefficient of kinetic friction. This angle is readily altered by changing the relationship of the pivot points 24 and 20 and this is the manner in which this factor is used as a control factor in the operation of the device.

By definition, the coefficient of kinetic friction between two surfaces $$f_k = \frac{F}{W}$$

where F is the force of kinetic friction and W is the normal force. Since, in the present arrangement the normal force is applied to the polishing tool through an angle of friction θ the ratio of forces tending to cause a relative pivotal movement between the block 19 and the channel 18 will vary as $W' \cdot w$ and $F \cdot f$, or will be dependent on the ratio of the moment arms for the two forces. Accordingly, different values of coefficient of friction can be obtained by changing the critical angle of friction θ since this alters the ratio of the moment arms $w$ and $f$. This can be done in the present arrangement by shifting the hinged pins 20 into different openings 21 along the channel 18, and/or adjusting the ball 24 to and from the block 19 by means of the threaded connection 26. The combination of these two adjustments proves advisable because one is a coarse adjustment and the other is a fine adjustment.

After a given value of a coefficient of kinetic friction which has been found to give the most efficient polishing performance is chosen, the point of pivotal connection between the block and the channel, and/or the length of the ball stem, is adjusted to obtain the critical angle of friction which will give moment arms for the forces F and W' whose ratio equals the desired coefficient of friction. Then so long as the work is sufficiently lubricated, $W' \cdot w$ will be $>F \cdot f$ and the block 19 will assume its normal position, see Fig. 1, wherein the free end of the block is adjacent the under side of the channel. In this position, $F_r$, the resultant of forces of F and W', will act above the pivot point 20. If the work becomes too dry, then the frictional force F exceeds the value predetermined by the coefficient of friction chosen for control purposes and the value $F \cdot f$ becomes $>W' \cdot w$ whereupon the weighted spindle 10 is raised relative to the block permitting the free end of the block to move away from the channel 18. In this position, the force $F_r$ will act below the pivot point 20. Now when the polishing tool reaches the end of the stroke to the left and starts to the right the frictional force F changes its direction and $F \cdot f$ is added to $W' \cdot w$ so that the spindle drops and the free end of the block 19 moves up against the channel with considerable force.

This relative movement between the block and the channel will be repeated each time the polishing tool changes its direction of movement and so long as the work is too dry. All that remains now is to use this relative movement between the channel and block to operate some form of pump mechanism or a valve mechanism to apply a lubricant to the polisher or work. This can, undoubtedly, be done in a number of different ways and we have shown two ways which are particularly suitable for a number of reasons.

In accordance with one embodiment of our invention, in Figs. 1–4 we have shown the lubricant applying mechanism as including a union and valve housing 35 fixed to the end of the channel 18 to be moved therewith. This union and valve housing comprises an intake 36 connected by a suitable flexible tubing 37 with a reservoir 34 of suitable lubricant, i. e. water, fixed to the spindle 10 by a bracket 38. The valve housing includes a first outlet 39 to which is connected a dead-end bulb 40 of flexible material, and which is adapted to extend into the space between the block 19 and channel 18 and be normally compressed when the work is sufficiently lubricated and the channel and block are in their normal positions shown in Fig. 1. The valve housing 35 also includes a second outlet 41 to which a discharge tube 42 of deformable material, such as copper, is adapted to be connected, said tube being arranged to discharge the lubricant onto the work at an advantageous point. The intake and first outlet, and the first outlet and second outlet, are connected by two small check valves 43 and 44, respectively, whose operation will be obvious from the following description.

So long as the work is sufficiently wet, as determined by the chosen coefficient of friction, $W' \cdot w$ will be $>F \cdot f$ and the block and channel will remain in their normal relative positions in which they compress the bulb 40. If the work becomes too dry and the polishing tool is moving to the left, the frictional force F will increase until $F \cdot f$ will be $>W' \cdot w$ and the block 19 and the channel 18 will move relative to one another to the positions shown in Fig. 3 and the bulb 40 will expand and draw water thereinto through the check valve 43. On the return stroke of the polishing tool $W' \cdot w$ and $F \cdot f$ will be in the same direction so that the block and channel will move toward one another with a powerful stroke and will compress the bulb to force the contained lubricant out through the other check valve 44 and through the discharge tube 42 onto the work behind the polishing tool. This pumping action will continue with each complete stroke of the tool until the work is sufficiently lubricated to make $W' \cdot w > F \cdot f$ whereupon the channel and block will remain in the relative positions shown in Fig. 1 until the work again becomes too dry, or stating it another way, until the coefficient of kinetic friction exceeds the chosen value for which the parts are adjusted to respond.

As was previously pointed out, experiments have proved that a more efficient polishing action takes place if the lubricant is added to the work in small amounts until just the right amount is obtained than if a larger amount is added just once in a while as is common practice. For this reason, therefore, instead of having the relative movement of the block and channel act to open a valve controlling the lubricant supply under pressure, and as is within the scope of the present invention, in which case the work would be flooded unless special precaution was taken, a much more efficient device is produced by the intermittent pumping action set forth.

It may be desirable to control the amount of water delivered at each operation of the mechanism and this may be effected in a number of ways. To illustrate one convenient way of accomplishing this with the particular mechanism disclosed, we have shown a means for regulating the amount of relative movement possible between the block and channel and whereby the amount of expansion and compression of the bulb 40 can be controlled. As shown, this means may comprise supporting the pin 30 in a block 45 having a stem 46 rotatably mounted in an adjusting sleeve 47 threaded into the block 19, see Figs. 1 and 4. The end of the stem 46 has a collar 49 pinned thereto to hold the block 45 in engagement with the top of the adjusting sleeve and a lock nut 50 is provided to hold the adjusting sleeve in any position of adjustment. The opening in the tapped hole in the block 19 may be covered by a screw cap 51 to exclude the entrance of foreign material thereinto. It will be obvious from the above description that by adjusting the position of the pin 30 vertically of the block the amount of relative movement between the block and channel that is possible can be varied, and that in this way the pumping action of the device can be adjusted within limits determined by the maximum capacity of the bulb. It is pointed out, however, that the pin and slot connection should not permit an adjustment of the pin 30 which would permit a relative movement between the block and channel which would be sufficient to permit the ball 24 to become detached from the socket 25, a condition which might prevail if the work should become too dry and the force of friction should build up to a prohibitive value as the result thereof if the pumping mechanism failed to function promptly or properly for any reason whatsoever.

Figure 7:
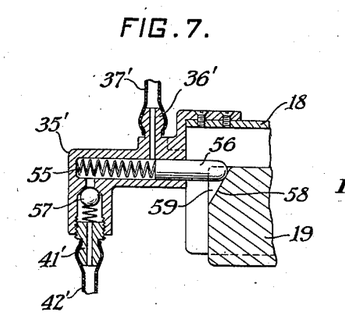
Fig. 7 is a sectional detail showing a second embodiment of lubricant pumping mechanism which may be automatically controlled by the coefficient of kinetic friction exceeding a predetermined value. In this figure the parts of the mechanism are in the position they would assume if the work required a lubricant and the polishing tool was moving to the left (referring to Fig. 3)
Figure 8:
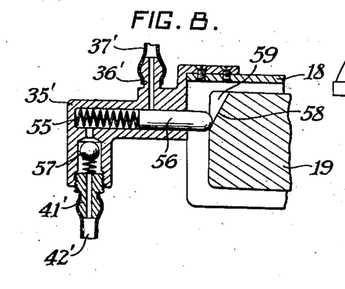
Fig. 8 is a view corresponding to Fig. 7, but with the parts of the mechanism shown in the position they assume when the work is sufficiently lubricated and/or when the polishing tool is moving to the right (referring to Fig. 3)

In Figs. 7 and 8 we have shown another embodiment of a lubricant pumping mechanism which might be used in place of the one previously described. This pumping mechanism works on the plunger principle and includes a valve housing 35' fixed to the channel 18, an intake 36' which is connected to a suitable supply of lubricant by a tubing 37', a chamber 55 including a spring-pressed plunger 56, and an outlet 41', normally closed by a check valve 57, and connected to a discharge tube 42'. With this arrangement the end of the plunger is adapted to engage the inclined bottom 58 of a groove 59 in the end of the block 19 so as to be moved axially in response to a relative movement between the block and channel.

It will be observed that when the coefficient of friction between the tool and the work exceeds a predetermined value and the block and channel are relatively displaced due to this occurrence, see Fig. 7, the plunger 56 will be allowed to uncover the intake 36' and the lubricant will flow into the chamber 55 by gravity and/or pressure. Then when the polishing tool starts to move in the opposite direction, to the right, the block and channel will be moved together sharply, see Fig. 8, and the lubricant in chamber 55 will be forced through the check valve 57, into the discharge tube and be applied to the work as before. This pumping action will be repeated at each stroke of the polishing tool until the work is sufficiently wet to bring the coefficient of friction down to, or below, the predetermined value for which the parts are adjusted.

Although we have specifically shown and described our invention as including a pumping mechanism for automatically causing the intermittent application of lubricant to the work, we wish to emphasize that the mechanism set forth could just as well be adapted to operate a valve to permit the flow of water from the ordinary pressure line. Since such a modification of the device would be more or less obvious in view of the arrangements disclosed we have not deemed it necessary to specifically include a showing thereof in the drawings. In this connection instead of having the relative movement between the channel 18 and the block 19 operate a pumping mechanism as set forth, the tripping of this connection would temporarily open a valve to let the water flow from the line to the work. The degree of opening of the valve could be adjusted to cause the addition of just the desired amount of water to the work at any one time to prevent undesirable flooding or an adjustable needle valve could be placed in the discharge tube 42 or 42'. An advantage of such an arrangement would be that the operator would not have to keep the reservoirs 34 filled with water, although it is conceivable that this could be accomplished by a float controlled valve in each container connected to a constant source of supply.

While we have chosen to show our novel method and apparatus for polishing as applied to the problem of polishing a plane horizontal surface, this is because the operation and theory of the same is more clearly explained and understood under these conditions of operation and is not intended to infer that the same cannot be used to polish curved surfaces. The present method and apparatus can be used to polish curved surfaces as well as flat surfaces, if the curves are weak. The only different condition which must be considered in the polishing of curved surfaces is that the critical angle of friction may vary throughout the stroke of the tool rather than remaining constant as in the case of plane horizontal surfaces. Furthermore, in addition to the opposing force of friction there is the opposing force which will be due to the tool having to be moved upwardly on the curved surface which will be added to the frictional force until the tool passes over the crown of the curve and starts downwardly on the opposite side.

Thus, if a convex surface is being polished, the parts will be adjusted to give a critical angle of friction which will account for a given coefficient of friction plus the added opposing force at any point on the surface involved in moving the tool upwardly on the curved surface when the tool is moving to the left. There is no fallacy in setting the critical angle of friction in accordance with the coefficient of friction at any given point in the stroke of the polishing tool, because it is generally assumed that all points on the surface being polished are equally wet or dry, and if one point is relied upon in the work to call for more lubricant then the whole surface needs lubricant, and vice versa. When polishing a convex surface a complete pumping action may take place while the tool is moving to the left, due to the fact that if the work is too dry, and the block and channel are consequently relatively displaced, the block and channel may be relatively moved together again when the tool passes over the crown of the surface and starts downwardly on the curve in which case this added opposing force due to moving the tool upgrade will be absent. In the opposite sense, if the surface being polished is a concave one, the added opposing force required to move the tool up the curve will come at the end of the stroke of the tool to the left and the pumping action will accordingly take place at a different point in the stroke of the tool. It makes no difference at what point in the stroke of the tool the pumping action of the parts occur because the discharge tube of the pump can be suitably located to apply the lubricant to the work where desired.

While the apparatus above set forth works well on plano work or work having weak curves, for use on strong curves we find it necessary to add a spring or its equivalent to the tripping mechanism to stop it from tripping too soon.

Therefore, for use with strong curves the apparatus should be modified as illustrated in Fig. 10. In order to explain this most clearly we have illustrated the mechanics of the above set forth mechanism in a somewhat different way.

Referring to Fig. 5 let us consider the forces acting on the ball 24 when the mechanism is moving to the left and working on plano work. W' is a force vector normal to the surface of the polishing tool 17 and its value equals the total weight W acting downwardly on the spindle and transmitted to the block 19 at the hinge point 20. F is the friction vector parallel to the surface of the polishing tool. The vector sum of these two forces is the vector $F_r$ acting on the ball 24. If $F_r$ passes above the hinge point 20 it will have a moment arm and, therefore, a torque to rotate the block clockwise until it contacts the top of the channel 18 on the spindle, or the pin 30 on the block contacts the end of the slot 31 in the channel wall, to get a balancing counterclockwise torque. This is the condition when no water is required on the work. Whenever the polisher dries up to such an extent that F is increased so that the resultant force $F_r$ passes below the hinge point 20 a counterclockwise torque is provided and the block 19 rotates counterclockwise until stopped by an added clockwise torque provided by a force from a suitable mechanical stop or until the pin 30 engages the other end of the slot 31.

Figure 9:
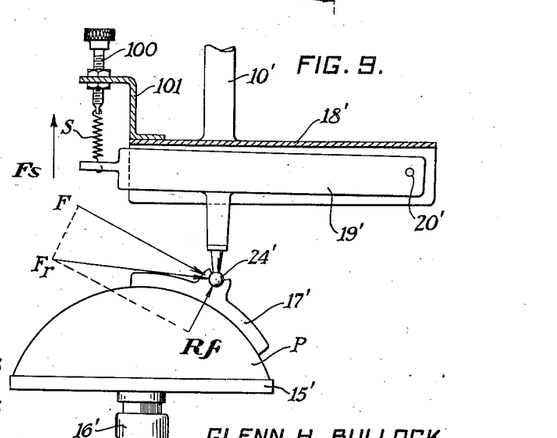
Fig. 9 is a front elevation view, partly in section, of another embodiment of the apparatus adapted for polishing work having strong curves.

Consider now a similar mechanism working on a strong curve that is high in the center as shown in Fig. 9. In this instance the part P may be a convex lens to be polished or a convex polisher while the part 17' may be a concave polisher or a concave lens holder. The forces acting on the ball 24' are shown as before. It will be clear that unless the friction force F is small compared to $R_t$, the radial force due to the downward force W, the resultant force vector $F_r$ will pass well below the hinge point 20' thus giving a strong counterclockwise torque to the block 19'.

Since fastest polishing is obtained with rather high coefficients of friction $$\frac{F}{W'}$$

some way must be found to reduce this counterclockwise torque or to provide an additional clockwise one. If the hinge point 20' could be lowered, the lever arm for the resultant force $F_r$ could be reduced. In this connection it should be noticed that when the mechanism moves to the left of the work the hinge point 20' must pass over the high point of the work. Accordingly, the hinge point 20' cannot be lowered very much unless the block 19' is made in the form of a fork so that the two hinge points 20', corresponding to hinge points 20 of the embodiment shown in Figs. 1–6, are astride the work. While this is one way of solving the problem, a way which we deem better, and have shown in Fig. 9, is to provide an additional clockwise torque of constant, or nearly constant, amount on the block 19'. As shown, this may be done by connecting one end of a tension spring S to the free end of the block 19' to the left of the ball 24' and the other end of the spring to an adjusting screw 100 threaded into an arm 101 fixed to the end of the lateral extension 18' on the spindle 10'. By adjusting the tension in this spring the value of the kinetic friction force F which will be required to trip the mechanism, or cause a relative displacement between the block 19' and the lateral extension 18' on the end of the spindle, can be increased over a desired range.

This spring S, if it is a tension spring, will introduce a force, indicated by the vector $F_s$, which will act through a moment arm to tend to move the block 19' clockwise about its pivot point 20', and thereby counteract the torque of the force F. It should be remembered that so long as the parts are in their normal position, or block 19' is held against the underside of the channel 18', the force $F_s$ of the spring is not acting. This force does not come into play until the resultant force $F_r$ passes below the pivot point 20' and tends to swing the block 19' counterclockwise from its normal position.

Even for plano work or work having weak curves it may be advantageous to use some spring tension or compression in the manner set forth primarily for the purpose of getting a convenient fine adjustment for the value of the kinetic frictional force which will trip the mechanism without having to rely on relative adjustment of the hinge and pivot points 20 and 24 as set forth in connection with the preferred embodiment of the invention. If spring action is used for adjustment purposes on the apparatus adapted for polishing plano work, the spring action should preferably be capable of acting in both directions, or induce a clockwise or counterclockwise torque on the block 19. This could be accomplished in any number of ways, and as an example of one, both a compression and a tension spring could be connected to act on the block 19 in the manner and at a position on the block as shown in Fig. 9, and means could be provided for alternately rendering each of the springs operative and inoperative depending upon whether a clockwise or counterclockwise torque is desired on the block.

When this spring action is introduced into the apparatus we depart somewhat from the true use of the coefficient of kinetic friction as the sole factor of control. It is an intermediate case between using the true coefficient of kinetic friction and using the force of kinetic friction as the control factor.

In polishing strong curves that are low in the center, or concave, a condition similar to that encountered in polishing strong convex curves would be encountered. The mechanism would then trip at the end of its stroke however, instead of at the beginning, and the addition of the spring force would again be indicated. As is well known in the art, the glass to be polished is often located on top of the polishing tool and is oscillated thereover, and this relative location of parts for both plano and curved work is sometimes preferred for known reasons. This means that the polisher and work are just reversed in the apparatus as we have illustrated it, or the work is mounted in the tool holder 17 or 17' and the polisher is mounted on the holder 15. Therefore, in the claims when we refer to the oscillatable tool holder as the polishing tool we are referring to the holder broadly, and intend it to cover the driven tool whether it carries the polisher or glass to be polished.

From the above description it will be readily apparent that we have devised a novel method and apparatus for polishing which not only indicates when the work is too dry but serves to apply just the proper amount of lubricant necessary to a most efficient operation. The coefficient of kinetic friction between the polishing tool and surface being polished or an intermediate case between the coefficient of kinetic friction and the force of kinetic friction is used as the factor to control the addition of lubricant to the work, and it is believed tha these factors are more fundamental for control purposes than the force of kinetic friction alone which was previously used in this capacity. For one thing, when using the coefficient of friction as the control factor, if it is desired to increase or decrease the normal force on the tool during the polishing operation this can readily be done without changing the adjustment of the parts because the frictional force allowed will vary directly with the normal force to satisfy the coefficient of friction chosen. If, on the other hand, the frictional force is the controlling factor and the device is set to operate at a given value thereof, then if it is found desirable to increase the normal force during the polishing operation, the parts must be readjusted to give a new predetermined frictional force corresponding thereto or the device will continually call for a lubricant until the work is unduly wet.

With the present method and apparatus, the lubricant is not only added automatically, but is intermittently added to the work in small, regulatable amounts so that the work can be maintained at a degree of wetness which is conducive to the most efficient polishing action. Lubricant is not flooded onto the work in excessive amounts to wash off unused abrasives and/or to reduce the polishing action due to its lubricating action which prevents the polisher from contacting the work. The arrangement is extremely simple, rugged and cheap in construction, and is of such a nature that it can be readily applied to existing polishing machines without too much trouble or appreciable modification of such machines. It will further be observed that the powerful return stroke of the block and channel toward one another is used to do the work of pumping so that the actual tripping of the mechanism in response to a predetermined coefficient of friction between the surfaces is unhampered in any way. By virtue of the arrangement set forth a part, or parts, of the polishing machine proper forms an integral part of the pumping mechanism, and the parts can be easily and accurately adjusted to respond to any coefficient of friction which might be desired.

Although we have shown and described certain specific embodiments of our invention, we are fully aware that many modifications thereof are possible. Our invention, therefore, is not to be limited to the precise details of construction and operation shown and described, but is intended to cover all modifications coming within the scope of the appended claims.

Having thus described our invention, what we claim as new and desire to secure by Letters Patent of the United States is:

1. An apparatus for polishing a surface and comprising in combination a work holding tool on which a piece to be polished is adapted to be mounted, a polishing tool adapted to be moved in contact with said work, means for oscillating one of said tools relative to the other and for applying a downward pressure thereon, said last mentioned means including a spindle oscillating mechanism, a spindle adapted to be oscillated by said mechanism and free to move vertically relative to said tools, means normally urging said spindle in a downward direction, an articulated driving and pressure transmitting connection between the oscillatable tool and spindle, and comprising a member pivoted adjacent one end to said spindle and pivoted adjacent the other end to said oscillatable tool so that said pivot points are relatively spaced in two directions and the downward force acting on the spindle is applied to the tool at an angle to the horizontal and in a direction to oppose the kinetic frictional force between the polishing tool and the work when the oscillatable tool is moving in one direction, whereby said articulated member is adapted to move to and from the spindle as the tool oscillates when the work becomes so dry that the kinetic friction exceeds that value established by the relative location of said pivot points and the moments of force acting on said member about said points, and the reciprocal movement of said pivoted member indicates the need for the addition of a lubricant to the work, a flexible tube having one end connected to a source of lubricant and the other end connected with a discharge conduit, a pair of check valves associated with opposite ends of said tube so that an expansion of the tube allows the same to fill up from the source and a compression of the tube causes a discharge of the lubricant through the discharge conduit, said tube located between the spindle and articulated member so as to be repeatedly expanded and compressed when the relative displacement between the two varies, and thereby pump lubricant onto the work when, and during the time, the work is so dry that the kinetic frictional force is in excess of said established value.

2. An apparatus for polishing a surface and comprising in combination a work holding tool on which a piece to be polished is adapted to be mounted, a polishing tool adapted to be moved in contact with said work, means for oscillating one of said tools relative to the other and for applying a downward pressure thereon, said last mentioned means including a spindle oscillating mechanism, a spindle adapted to be oscillated by said mechanism and free to move vertically relative to said tools, means normally urging said spindle in a downward direction, an articulated driving and pressure transmitting connection between the oscillatable tool and spindle, and comprising a member pivoted adjacent one end to said spindle and pivoted adjacent the other end to said oscillatable tool so that said pivot points are relatively spaced in two directions and the downward force acting on the spindle is applied to the tool at an angle to the horizontal and in a direction to oppose the kinetic frictional force between the polishing tool and the work when the oscillatable tool is moving in one direction, whereby said articulated member is adapted to move to and from the spindle as the tool oscillates when the work becomes so dry that the kinetic friction exceeds that value established by the relative location of said pivot points and the moments of force acting on said member about said points, and the reciprocal movement of said pivoted member indicates the need for the addition of a lubricant to the work, means for pumping a lubricant onto said work, said pumping means including said articulated member the reciprocal movement thereof relative to said spindle being adapted to cause the intermittent application of the lubricant to said work, and means for limiting the extent of the relative displacement between the spindle and said member to control the quantity of lubricant applied to the work.

3. An apparatus for polishing a surface and comprising in combination a work holding tool on which a piece to be polished is adapted to be mounted, a polishing tool adapted to be moved in contact with said work, means for oscillating one of said tools relative to the other and for applying a downward pressure thereon, said last mentioned means including a spindle oscillating mechanism, a spindle adapted to be oscillated by said mechanism and free to move vertically relative to said tools, means normally urging said spindle in a downward direction, an articulated driving and pressure transmitting connection between the oscillatable tool and spindle, and comprising a member pivoted adjacent one end to said spindle and pivoted adjacent the other end to said oscillatable tool so that said pivot points are relatively spaced in two directions and the downward force acting on the spindle is applied to the tool at an angle to the horizontal and in a direction to oppose the kinetic frictional force between the polishing tool and the work when the oscillatable tool is moving in one direction, whereby said articulated member is adapted to move to and from the spindle as the tool oscillates when the work becomes so dry that the kinetic friction exceeds that value established by the relative location of said pivot points and the moments of force acting on said member about said points, and the reciprocal movement of said pivoted member indicates the need for the addition of a lubricant to the work, a flexible tube having one end connected to a source of lubricant and the other end connected with a discharge conduit, a pair of check valves associated with opposite ends of said tube so that an expansion of the tube allows the same to fill up from the source and a compression of the tube causes a discharge of the lubricant through the discharge conduit, said tube located between the spindle and articulated member so as to be repeatedly expanded and compressed when the relative displacement between the two varies, and thereby pump lubricant onto the work when, and during the time, the work is so dry that the kinetic frictional force is in excess of said established value, and means for limiting the relative displacement between the articulated member and said spindle to control the quantity of lubricant supplied to the work.

4. An apparatus for polishing a surface and comprising in combination a work holding tool on which a piece to be polished is adapted to be mounted, a polishing tool adapted to be moved in contact with said work, means for oscillating one of said tools relative to the other and for applying a downward pressure thereon, said last mentioned means including a spindle oscillating mechanism, a spindle adapted to be oscillated by said mechanism and free to move vertically relative to said tools, means normally urging said spindle in a downward direction, an articulated driving and pressure transmitting connection between the oscillatable tool and spindle, and comprising a member pivoted adjacent one end to said spindle and pivoted adjacent the other end to said oscillatable tool so that said pivot points are relatively spaced in two directions and the downward force acting on the spindle is applied to the tool at an angle to the horizontal and in a direction to oppose the kinetic frictional force between the polishing tool and the work when the oscillatable tool is moving in one direction, whereby said articulated member is adapted to move to and from the spindle as the tool oscillates when the work becomes so dry that the kinetic friction exceeds that value established by the relative location of said pivot points and the moments of force acting on said member about said points, and the reciprocal movement of said pivoted member indicates the need for the addition of a lubricant to the work, a supply of lubricant, a discharge conduit for directing lubricant onto the work, a union connected to said supply and discharge conduit and including a pair of check valves, a flexible bulb connected to said union so that upon expansion it is adapted to fill up from said supply and upon compression it is adapted to discharge its contents into the discharge conduit, said flexible bulb being disposed between said spindle and pivoted member whereby movement of the latter to and from the spindle acts to repeatedly pump lubricant onto the work when the kinetic frictional force exceeds the value established by the chosen relationship of pivot points for the articulated member and the moments of force acting on said member about said points.

5. An apparatus for polishing a surface and comprising in combination a work holder on which a piece of work to be polished is adapted to be mounted, a polishing tool adapted to rest on said piece, a block having a post extending vertically thereof and having a pivotal connection with said tool, a spindle reciprocating mechanism above said tool, a spindle arranged to be reciprocated by said mechanism and adapted to be movable vertically relative to the work holder, means normally urging said spindle downwardly, a lateral extension on said spindle, a hinged connection between said extension and said block, the axis of said connection being horizontal and located vertically above and to one side of said pivotal connection between the post and the tool whereby the downward force on said spindle is resolved into a force which is applied to the tool at an angle to the horizontal, and whereby a predetermined kinetic frictional force between the work and tool is adapted to cause the spindle to be raised and cause a relative pivotal movement between the lateral extension thereon and the block when the tool is moving in one direction, and means actuated by the relative pivotal movement of said block and extension to indicate that the work is lacking sufficient lubricant.

6. An apparatus for polishing a surface and comprising in combination a work holder on which a piece of work to be polished is adapted to be mounted, a polishing tool adapted to rest on said piece, a block having a post extending vertically thereof and having a pivotal connection with said tool, a spindle reciprocating mechanism above said tool, a spindle arranged to be reciprocated by said mechanism and adapted to be movable vertically relative to the work holder, means normally urging said spindle downwardly, a lateral extension on said spindle, a hinged connection between said extension and said block, and located vertically above and to one side of said pivotal connection between the post and the tool whereby the downward force on said spindle is resolved into a force which is applied to the tool at an angle to the horizontal, and whereby a predetermined kinetic frictional force between the work and tool is adapted to cause the spindle to be raised and cause a relative displacement between the lateral extension thereon and the block when the tool is moving in one direction, a flexible bulb connected to a source of supply of lubricant and a discharge to the work and having check valves controlling communication with the two, said bulb located between the lateral extension on said spindle and the block to be intermittently compressed and expanded by a variation in the relative displacement between the two and thereby pump a quantity of lubricant onto the work.

7. An apparatus for polishing a surface and comprising in combination a work holder on which a piece of work to be polished is adapted to be mounted, a polishing tool adapted to rest on said piece, a block having a post extending vertically thereof and having a pivotal connection with said tool, a spindle reciprocating mechanism above said tool, a spindle arranged to be reciprocated by said mechanism and adapted to be movable vertically relative to the work holder, means normally urging said spindle downwardly, a lateral extension on said spindle, a hinged connection between said extension and said block, the axis of said connection being horizontal and located vertically above and to one side of said pivotal connection between the post and the tool, whereby the downward force on said spindle is resolved into a force which is applied to the tool at an angle to the horizontal in a direction to oppose the kinetic frictional force when the tool is moving in one direction, and whereby a predetermined kinetic frictional force between the work and tool is adapted to cause the spindle to be raised and cause a relative displacement between the lateral extension thereon and the block when the tool is moving in one direction, and means for applying a variable force to the block at a point spaced laterally of the hinged point for varying the value of the kinetic frictional force which will cause a relative displacement between the spindle and the block independently of a change in the spaced relationship of the hinged point and said pivot point.

8. An aparatus for polishing a surface according to claim 7, in which said last mentioned means comprises a compression spring acting downwardly on said block, and means for adjusting the compression in said spring.

9. An apparatus for polishing a surface according to claim 7, in which said last mentioned means comprises a tension spring connected at one end to said block and pulling upwardly thereon, and means for adjusting the tension in said spring.

10. An apparatus for polishing a surface according to claim 7 in which said last mentioned means comprises a compression spring acting downwardly of said block, means for adjusting the compression in said spring, a tension spring pulling upwardly thereon, means for adjusting the tension in said spring, and means for rendering each of said springs alternatively effective and ineffective.

11. An apparatus for polishing a surface and comprising in combination a work holder on which a piece to be polished is adapted to be mounted, a polishing tool, means for oscillating said tool in contact with said work and for applying a downward pressure on said tool, said last mentioned means including a spindle oscillating mechanism, a vertical spindle adapted to be oscillated by said mechanism and free to move vertically thereof, means normally urging said spindle in a downward direction, an articulated driving and pressure transmitting connection between said tool and spindle, and including a member pivoted to said spindle and tool at points relatively spaced horizontally and vertically so that the downward force is applied to the tool at an angle to the horizontal and in a direction to oppose the kinetic frictional force between the work and the tool when the tool is moving in one direction, the pivot between the spindle and member having a horizontal axis whereby the relative displacement between the free end of said articulated member and the spindle is adapted to vary in a vertical direction as the tool oscillates when the work becomes so dry that the frictional torque on the pivoted member exceeds the torque thereon in the opposite direction due to the normal force, and the ratio of which is established by the relative location of said pivot points of the articulated member, and a variation of said relative displacement between said articulated member and said spindle indicates the need for the addition of a lubricant to the work.

12. An apparatus according to claim 11, and including means for altering the value of the torques acting on said articulated member about its pivot point with the spindle for varying the critical ratio of torques at which relative displacement of the pivoted member and spindle will take place.

13. An apparatus according to claim 11, and including means for altering the relative spacing of said two pivot points for the purpose of varying the critical ratio of torques at which relative displacement of the pivoted member and spindle will take place.

14. An apparatus according to claim 11, and including means for introducing a torque acting on said articulated member about its pivot point with the spindle for varying the critical ratio of torques at which relative displacement of the pivoted member and spindle will take place.

15. An apparatus according to claim 11, and including means actuated by movement of said articulated member from its normal position relative to said spindle for causing the addition of a lubricant to the work.

16. An apparatus according to claim 11, and including means actuated by a variation in the relative displacement between the articulated member and said spindle for causing the intermittent addition of a lubricant to the work.

17. An apparatus according to claim 11, and including means for pumping a lubricant onto said work, and means for periodically instigating the operation of said pumping means when the work becomes too dry, said last mentioned means including said articulated member.

18. An apparatus for polishing a surface and comprising in combination a work holding tool on which a piece to be polished is adapted to be mounted, a polishing tool adapted to be moved in contact with said work, means for oscillating one of said tools relative to the other and for applying a downward pressure thereon, said last mentioned means including a spindle oscillating mechanism, a spindle adapted to be oscillated by said mechanism and free to move vertically relative to said tools, means normally urging said spindle in a downward direction, an articulated driving and pressure transmitting connection between the oscillatable tool and spindle, and comprising a member pivoted adjacent one end to the spindle and pivoted adjacent the other end to said oscillatable tool so that said pivot points are relatively spaced in two directions and the downward force acting on the spindle is applied to the tool at an angle to the horizontal and in a direction to oppose the kinetic frictional force between the polishing tool and the work when the oscillatable tool is moving in one direction, whereby said articulated member is adapted to move to and from the spindle as the polishing tool oscillates when the work becomes so dry that the kinetic friction exceeds that value established by the relative location of said pivot points and the moments of force acting on said member about said points, and the reciprocal movement of said pivoted member indicates the need for the addition of a lubricant to the work, and means for pumping a lubricant onto said work, said pumping means including said articulated member, whereby the reciprocal movement thereof is adapted to cause the intermittent application of the lubricant to said work.

19. The method of polishing a surface with a polishing tool which comprises the steps of causing a relative oscillation between the tool and said surface by applying the driving force to the tool along a line at an angle to the horizontal; applying a normal downward force to the tool so that the force of kinetic friction between the tool and the surface and the normal force between the tool and the surface, equal and opposite to said normal force, produce torques about a common center lying on said line of the driving force and which torques oppose one another when the tool is moving in one direction; determining when the ratio of said torques exceeds a predetermined value; and then applying lubricant to the surface until the ratio of said two torques drops to at least said predetermined value.

JOHN R. TURNER.
JOHN H. McLEOD.
GLENN H. BULLOCK.